(12) United States Patent
Shukla et al.

(10) Patent No.: US 9,147,529 B2
(45) Date of Patent: *Sep. 29, 2015

(54) ENERGY STORAGE DEVICE AND METHOD THEREOF

(75) Inventors: Ashok Kumar Shukla, Bangalore (IN); Musuwathi Krishnamoorthy Ravikumar, Bangalore (IN); Shaik Abdul Gaffoor, Hyderabad (IN)

(73) Assignee: Indian Institute of Science, Bangalore (IN)

( * ) Notice: Subject to any disclaimer, the term of this patent is extended or adjusted under 35 U.S.C. 154(b) by 146 days.

This patent is subject to a terminal disclaimer.

(21) Appl. No.: 13/698,346

(22) PCT Filed: Jun. 28, 2010

(86) PCT No.: PCT/IN2010/000439
§ 371 (c)(1),
(2), (4) Date: Nov. 16, 2012

(87) PCT Pub. No.: WO2011/161686
PCT Pub. Date: Dec. 29, 2011

(65) Prior Publication Data
US 2013/0063866 A1    Mar. 14, 2013

(30) Foreign Application Priority Data
Jun. 22, 2010   (IN) ............................. 1744/CHE/2010

(51) Int. Cl.
*H01G 11/30* (2013.01)
*H01G 11/04* (2013.01)
*H01M 4/04* (2006.01)
(Continued)

(52) U.S. Cl.
CPC ............... *H01G 11/04* (2013.01); *H01G 11/30* (2013.01); *H01M 4/0492* (2013.01); *H01M 12/005* (2013.01); *H01M 2/0277* (2013.01); *H01M 2/1646* (2013.01); *H01M 2/1653* (2013.01); *H01M 4/56* (2013.01); *H01M 2300/0011* (2013.01); *Y02E 60/13* (2013.01); *Y10T 29/417* (2015.01)

(58) Field of Classification Search
None
See application file for complete search history.

(56) References Cited

U.S. PATENT DOCUMENTS

| 3,202,611 | A | 8/1965 | Canty et al. |
| 3,536,531 | A | 10/1970 | Sekido et al. |

(Continued)

FOREIGN PATENT DOCUMENTS

| CA | 667488 | 7/1963 |
| JP | 09253547 | 4/1999 |

(Continued)

OTHER PUBLICATIONS

Pell W.G. et al., "Peculiarities and requirements of asymmetric capacitor devices based on combination of capacitor and battery-type electrodes" Journal of Power Sources, Oct. 1, 2004, vol. 136, Issue 2, pp. 334-345, section 7.

(Continued)

*Primary Examiner* — Dion R Ferguson
(74) *Attorney, Agent, or Firm* — Del Vecchio and Stadler LLP

(57) ABSTRACT

The present disclosure is related to hybrid capacitors specifically to $PbO_2$/Activated Carbon hybrid capacitors. The hybrid super capacitor of the present disclosure is simple to assemble, bereft of impurities and can be fast charged/discharged with high faradiac-efficiency.

18 Claims, 6 Drawing Sheets

(51) Int. Cl.
*H01M 12/00* (2006.01)
*H01M 2/02* (2006.01)
*H01M 2/16* (2006.01)
*H01M 4/56* (2006.01)

(56) References Cited

U.S. PATENT DOCUMENTS

| | | | |
|---|---|---|---|
| 4,326,017 | A | 4/1982 | Will |
| 5,079,674 | A * | 1/1992 | Malaspina ............... 361/502 |
| 6,129,822 | A | 10/2000 | Ferdman |
| 6,352,622 | B1 | 3/2002 | Brown et al. |
| 6,842,331 | B1 | 1/2005 | Kazaryan et al. |
| 7,948,739 | B2 * | 5/2011 | Zhamu et al. ............ 361/523 |
| 2006/0291139 | A1 * | 12/2006 | Nedoshivin et al. ...... 361/502 |
| 2007/0128472 | A1 | 6/2007 | Tierney et al. |
| 2008/0113268 | A1 | 5/2008 | Buiel et al. |
| 2008/0209876 | A1 | 9/2008 | Miller |
| 2009/0103242 | A1 * | 4/2009 | Buiel et al. ............... 361/502 |
| 2010/0203362 | A1 | 8/2010 | Lam et al. |
| 2011/0027653 | A1 * | 2/2011 | Ho et al. .................. 429/225 |

FOREIGN PATENT DOCUMENTS

| | | |
|---|---|---|
| WO | WO 02/19357 | 3/2002 |
| WO | WO 02/091412 | 11/2002 |
| WO | WO 03/098648 A1 | 11/2003 |
| WO | WO 2005/027255 A1 | 3/2005 |
| WO | WO 2007/001201 A1 | 1/2007 |
| WO | WO 2007/001202 A1 | 1/2007 |
| WO | WO 2008/070914 | 6/2008 |
| WO | WO 2009/052124 | 4/2009 |
| WO | WO 2009/052124 A1 | 4/2009 |

OTHER PUBLICATIONS

Ragheb, A et al., "Effect of current density and perchloric acid concentration on the formation of lead anodes in sulphuric acid baths" Materials and Corrosion, 23, pp. 105-109, Feb. 30, 1972.

* cited by examiner (1)

ENERGY STORAGE DEVICE AND METHOD THEREOF

CROSS REFERENCE TO RELATED APPLICATIONS

This application is a U.S. National Phase under 35 U.S.C. §371 of PCT Patent Application No. PCT/IN2010/000439 filed Jun. 28, 2010, which claims the priority of Indian Patent Application Number 1744/CHE/2010 filed Jun. 22, 2010, and the entire disclosures of both are hereby incorporated herein by reference.

TECHNICAL FIELD

The present disclosure is related to hybrid capacitors specifically to $PbO_2$/Activated Carbon hybrid ultracapacitors. The hybrid ultracapacitor of the present disclosure is simple to assemble, bereft of impurities and can be fast charged/discharged with high faradiac efficiency.

BACKGROUND

Supercapacitors (also termed as ultracapacitors) are being projected as potential devices that could enable major advances in energy storage. Supercapacitors are governed by the same physics as conventional capacitors but utilize high-surface-area electrodes and thinner dielectrics to achieve greater capacitances allowing energy densities greater than those of conventional capacitors and power densities greater than those of batteries. Supercapacitors can be divided into three general classes, namely electrical-double-layer capacitors, pseudocapacitors and hybrid capacitors. Each class is characterized by its unique mechanism for charge storage, namely faradaic, non-faradaic and the combination of the two. Faradaic processes, such as oxidation-reduction reactions, involve the transfer of charge between electrode and electrolyte as in a battery electrode while a non-faradaic mechanism does not use a chemical mechanism and rather charges are distributed on surfaces by physical processes that do not involve the making or braking of chemical bonds "similar to electrical" double-layer. A hybrid supercapacitor combines a battery electrode where the energy is stored in chemical form and an electrical-double-layer electrode where the energy is stored in physical form. A $PbO_2$/Activated Carbon supercapacitor comprises a positive plate akin to a lead acid cell and a high surface-area activated carbon electrode as negative plate. The charge-discharge reactions at the positive and negative plates of such a hybrid supercapacitors are as follows.

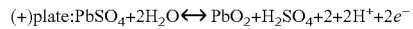

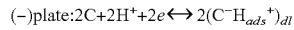

Accordingly, the net charge-discharge reactions for the hybrid supercapacitor can be written as follows.

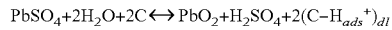

The (+) plate is realized by electrochemical plating and cycling in sulpuric acid/perchloric acid while the (−) plate is prepared by pasting activated carbon onto a lead sheet. The said hybrid supercapacitor stores energy both in chemical and physical forms.

The hybrid capacitors known in the prior art employ conventional $PbO_2$ plates that require sizing and mixing of the active materials of—appropriate compositions, pasting, drying, curing and formation. Such electrodes are not fully amenable to fast charge/discharge processes desirous of a capacitor.

STATEMENT OF DISCLOSURE

The present disclosure is in relation to an energy-storage device (1) comprising: a substrate-integrated-lead-dioxide electrode (2), an activated-carbon electrode (3), and a separator (4) soaked in an electrolyte (5) and placed in-between the substrate-integrated-lead-dioxide electrode and the carbon electrode in a container (6); an energy storage device (7) comprising plurality of energy storage device (1) of claim 1 connected in series; a method of preparing substrate-integrated lead dioxide comprising acts of, a) etching pre-polished lead sheets; b) washing the etched lead sheets with deionized water; c) immersing the washed lead sheets in mixture of sulphuric acid and perchloric acid to obtain a layer of lead sulphate; and d) oxidizing the lead sulphate to lead dioxide to obtain substrate-integrated lead dioxide; a method of manufacturing an energy storage device (1), comprising acts of: a) preparing substrate-integrated-lead-dioxide electrode (2), b) preparing activated-carbon electrode (3), and c) mounting the substrate-integrated-lead-dioxide electrode (2), the activated-carbon electrode (3) in a container (6) with separator (4) soaked in an electrolyte (5) in-between the substrate-integrated-lead-dioxide and the carbon electrodes to manufacture the energy-storage device; a method of using energy-storage device (1 or 7), said method comprising act of conjugating said energy-storage device with electrical device for generating electrical energy to devices in need thereof for working.

BRIEF DESCRIPTION OF ACCOMPANYING FIGURES

FIG. 1: Schematic diagram of substrate-integrated $PbO_2$/activated-carbon ultracapacitor.

FIG. 2: Schematic diagram of substrate-integrated $PbO_2$/activated-carbon ultra capacitors connected in series.

FIG. 3: Schematic diagram of electrochemical cell employed for preparing substrate-integrated $PbO_2$ electrodes.

FIG. 4: XRD patterns for the positive electrodes.

FIG. 5: Cyclic voltammograms for a $PbO_2$/Activated Carbon Hybrid Ultracapacitor.

FIG. 6: Constant current charge/discharge cycles.

FIG. 7: Life-cycle test.

FIG. 8: Constant current charge/discharge characteristics.

FIG. 9: Constant-potential charge and constant-current discharge characteristics.

FIG. 10: Cycle-life test for $PbO_2$/PVDF-bonded Activated-Carbon Hybrid Ultracapacitor.

FIG. 11: Constant-current discharge characteristics for 6V/40F $PbO_2$/Activated Carbon Hybrid Ultracapacitor.

DESCRIPTION OF DISCLOSURE

The present disclosure is in relation to an energy storage device (1) comprising:
a) a substrate-integrated-lead-dioxide electrode (2),
b) an activated-carbon electrode (3), and
c) a separator (4) soaked in an electrolyte (5) and placed in-between the substrate-integrated-lead-dioxide electrode and the carbon electrode in a container (6).

In an embodiment of the present disclosure, the energy storage device (1) is a hybrid capacitor.

In still another embodiment of the present disclosure, the separator (4) is made of material selected from a group comprising porous glass and porous polymers, preferably porous glass.

In yet another embodiment of the present disclosure, the electrolyte is selected from a group comprising sulphuric acid, methanesulfonic acid, perfluorosulphonic acid, and preferably sulphuric acid.

In yet another embodiment of the present disclosure, the sulphuric acid is concentrated in range from about 4M to about 7M, preferably about 6M.

In yet another embodiment of the present disclosure, the energy storage device (1) is of faradiac efficiency ranging from about 94% to about 96%, preferably 95%.

The present disclosure is also in relation to an energy-storage device (7) comprising plurality of energy-storage device (1) connected in series.

The present disclosure is also in relation to a method of preparing substrate-integrated lead dioxide comprising acts of,
  a) etching pre-polished lead sheets;
  b) washing the etched lead sheets with deionized water;
  c) immersing the washed lead sheets in mixture of sulphuric acid and perchloric acid to obtain a layer of lead sulphate; and
  d) oxidizing the lead sulphate to lead dioxide to obtain substrate integrated lead dioxide.

In still another embodiment of the present disclosure, the etching is carried out using Nitric acid.

In yet another embodiment of the present disclosure, the Nitric acid is of concentration ranging from about 0.5M to about 1.5M, preferably about 1M.

In yet another embodiment of the present disclosure, the sulphuric acid is concentrated in the range from about 4M to about 7M, preferably about 6M.

In yet another embodiment of the present disclosure, the perchloric acid is concentrated in the range from about 0.05M to about 0.2M, preferably about 0.1M.

In yet another embodiment of the present disclosure, the oxidation of lead sulphate to lead dioxide is by using the lead sulphate as an anode in an electrochemical cell.

The present disclosure is also in relation to a method of manufacturing an energy-storage device (1), comprising acts of:
  a) preparing substrate-integrated-lead-dioxide electrode (2),
  b) preparing activated carbon electrode (3), and
  c) mounting the substrate-integrated-lead-dioxide electrode (2), the activated carbon electrode (3) in a container (6) with separator (4) soaked in an electrolyte (5) in-between the substrate-integrated lead dioxide and the carbon electrode to manufacture the energy storage device.

In yet another embodiment of the present disclosure, the container (6) is made of material selected from a group comprising porous glass and porous polymer, preferably porous glass.

The present disclosure is also in relation to a method of using energy-storage device (1 or 7), said method comprising act of conjugating said energy-storage device with electrical device for generating electrical energy to devices in need thereof for working.

The present disclosure is related to realizing substrate-integrated $PbO_2$/Activated-carbon hybrid ultracapacitor bereft of impurities. The hybrid ultra capacitors of the present disclosure are simple to assemble, bereft of impurities, and can be fast charged/discharged with faradaic efficiencies as high as 95%.

In the current disclosure, the positive electrodes, substrate-integrated $PbO_2$ are made by electrochemical formation of pre-polished and etched lead metal sheets. Specifically, the substrate-integrated $PbO_2$ is obtained by oxidizing $PbSO_4$ which is formed when lead sheets come in contact with sulfuric acid. Subsequent to their formation, the electrodes are washed copiously with de-ionized water to wash off all the impurities. The XRD patterns for the formed electrodes were recorded and found to be free of impurities. The XRD patterns provided in the FIG. 4 clearly suggest the formation of lead dioxide. The negative electrode is an activated carbon electrode.

In the current disclosure of $PbO_2$/Activated carbon hybrid ultracapacitor, $PbO_2$ electrode is a battery-type electrode and activated carbon is a double-layer-capacitor electrode. FIG. 5 is a cyclic voltammogram for $PbO_2$/activated carbon hybrid ultracapacitor at a scan rate of 10 mV/s showing a peak for the oxidation of $PbSO_4$ to $PbO_2$ at 2V during the anodic scan and the corresponding reduction of $PbO_2$ to $PbSO_4$ at 1.5V during the cathodic scan. The oxidation and reduction peaks reflect the $PbO_2$/Activated carbon to be a hybrid device.

Generally, the battery electrodes are charged at C/10 rate (10 h duration) and discharged at C/5 rate (5 h duration). If the battery electrodes are charged/discharged at C rate or at higher rates their cycle-life is affected. Faradaic efficiency of the battery electrodes depends on the particle size of the active materials, porosity of the electrode, internal resistance of the electrode, etc. The battery electrodes have low faradaic efficiency.

The present disclosure provides, electrochemically formed and substrate-integrated $PbO_2$ as battery-type electrode that can be charged and discharged at higher rates with faradaic efficiencies as high as 95%. The same has been illustrated in FIG. 8. The FIG. 8 shows current charge and discharge curve at 50 mA for the substrate-integrated $PbO_2$/Activated hybrid ultracapacitor exhibiting faradaic efficiency as high as 95%.

FIG. 6 shows the charge and discharge polarization curves at 25 mA, 50 mA and 100 mA for a substrate-integrated $PbO_2$/Activated carbon hybrid ultracapacitor prepared by using Teflon as binder in the carbon electrodes. The capacitance is calculated from the discharge curve using the equation:

$$C(F) = I(A) \times t(s)/(V_2 - V_1)$$

where $V_2$ is the voltage at the beginning of discharge and $V_1$ is the voltage at the end of discharge. It is found that the hybrid ultracapacitor has a capacitance of 10.79 F at 25 mA, 10.05 F at 50 mA and 9.738 F at 100 mA.

The FIG. 7 shows the cycle-life data for the substrate-integrated $PbO_2$/Activated carbon hybrid ultracapacitor at 0.1 A suggesting the hybrid ultracapacitors to have high cycle-life. The cycle-life test involves the following four steps.
  Step 1. Charging the ultracapacitor at 2.3V for 10 min.
  Step 2. Open-circuit voltage measurement for 5 s.
  Step 3. Discharge the ultracapacitor at constant current at 0.2 A.
  Step 4. Open-circuit voltage measurement for 30 s.

Figure 11:
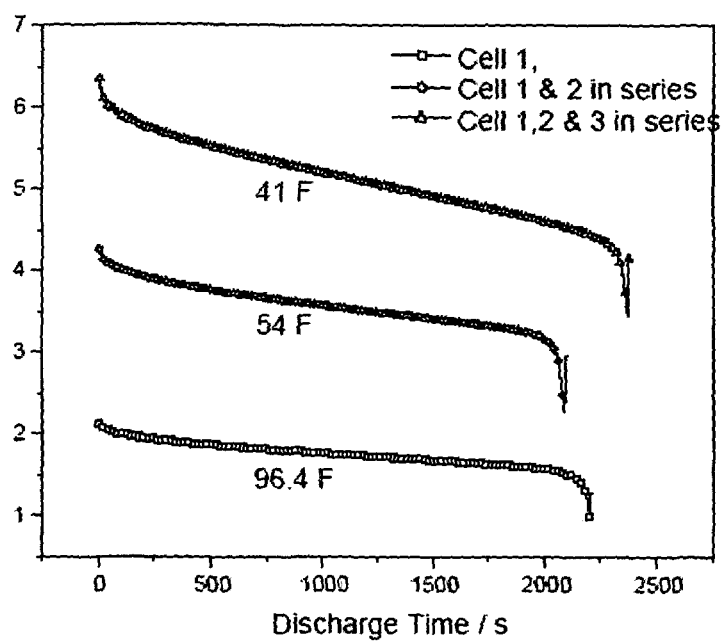

The hybrid capacitor of the present disclosure is connected in series to obtain capacitors wherein the cell voltage gets added up while their effective capacitance decreases akin to conventional capacitor. FIG. 11 shows the discharge curves at 0.2 A current for substrate-integrated $PbO_2$/Activated-carbon hybrid ultracapacitor cell comprising two and three cells connected in series. The figure indicates that the cell voltage is added up when two or more cells are connected in series while their effective capacitances decrease akin to conventional capacitors.

The method of manufacturing substrate-integrated $PbO_2$/activated-carbon hybrid ultracapacitor (1) essentially comprises: preparing substrate integrated lead dioxide electrode (2), preparing activated-carbon electrode (3), and mounting the substrate-integrated-lead-dioxide electrode (2), the activated-carbon electrode (3) in a container (6) with separator (4) soaked in an electrolyte (5) in-between the substrate-integrated lead dioxide and the carbon electrode to manufacture the energy-storage device.

The devices of the present disclosure can be easily conjugated with electrical devices for generating electrical energy to devices in need thereof for working.

The technology of the instant application is elaborated in detail with the help of following examples. However, the examples should not be construed to limit the scope of the disclosure.

EXAMPLE

Preparation of Substrate-Integrated $PbO_2$/Activated Carbon Hybrid Ultracapacitors A. Preparation of Substrate-Integrated $PbO_2$ Electrodes.

Figure 1:
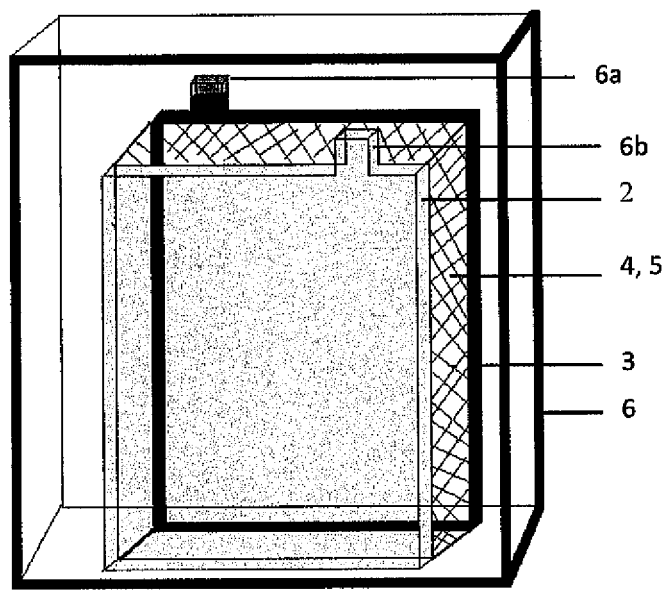
Figure 2:
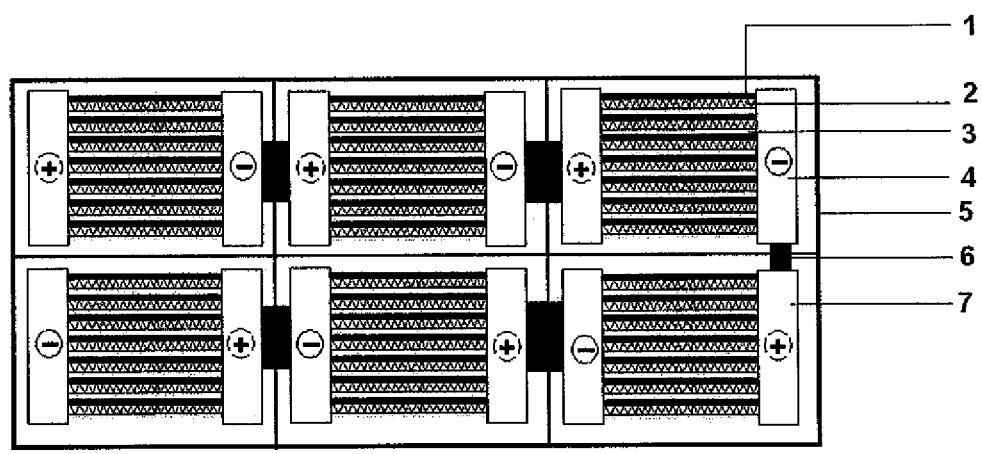
Figure 3:
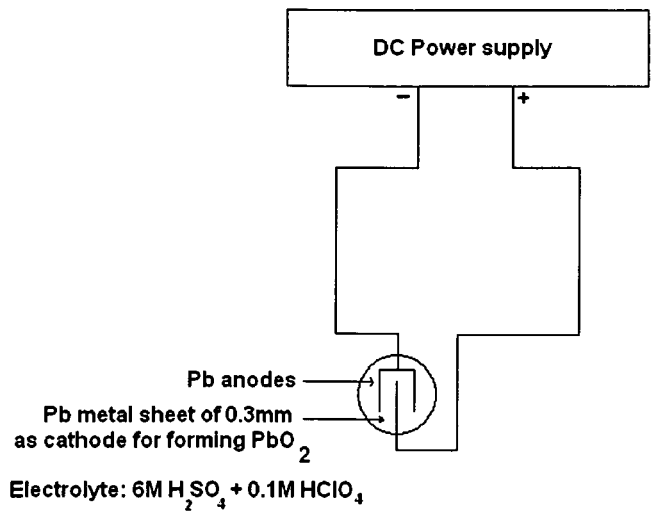
Figure 4:
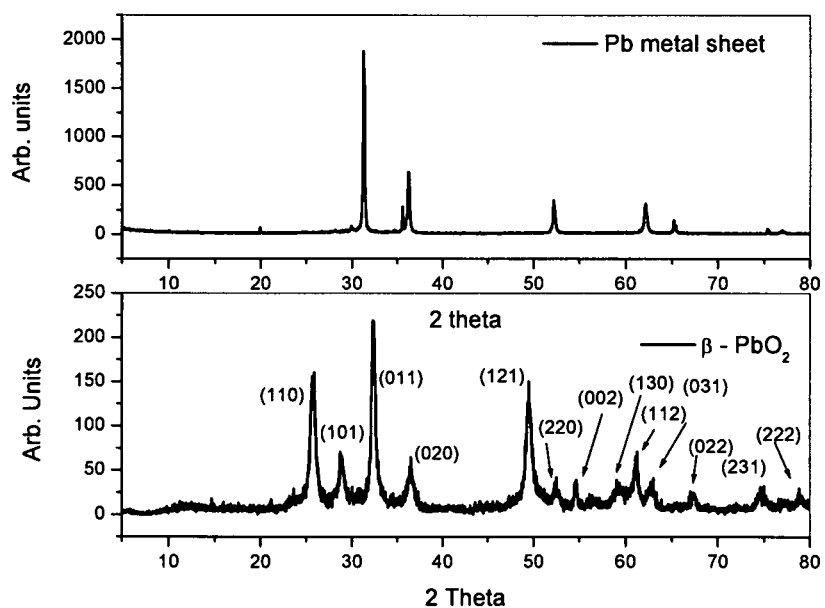
Figure 5:
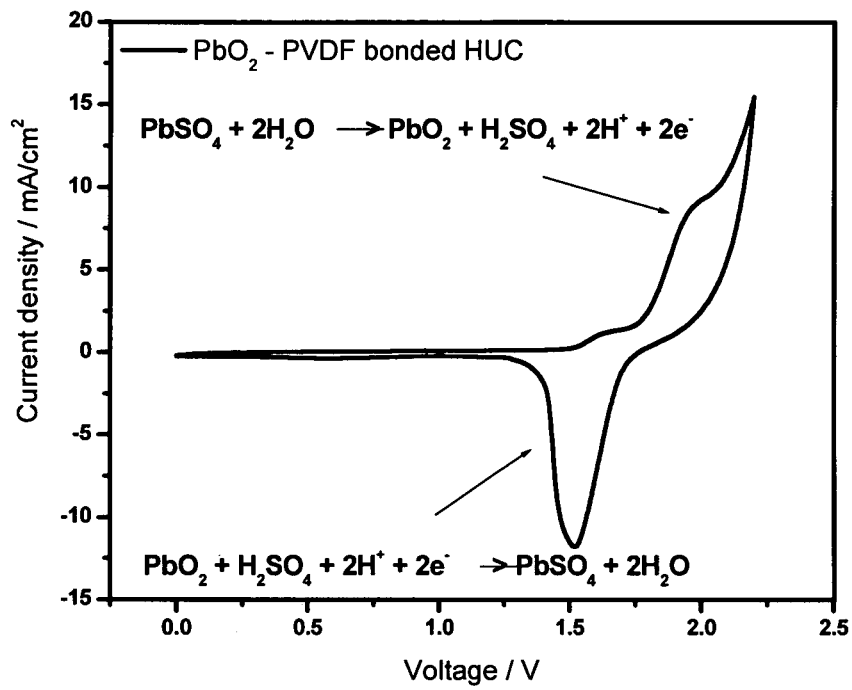
Figure 6:
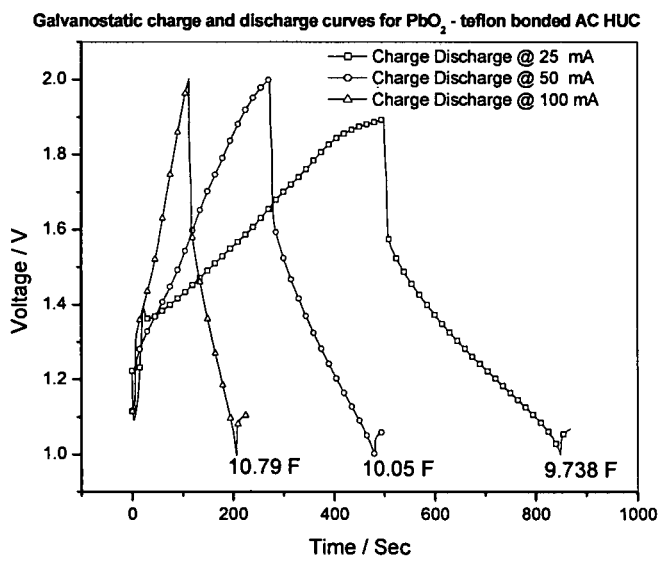
Figure 7:
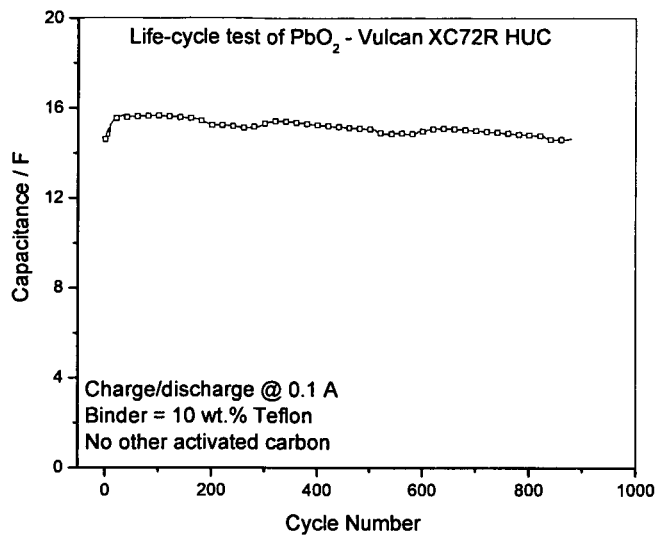
Figure 8:
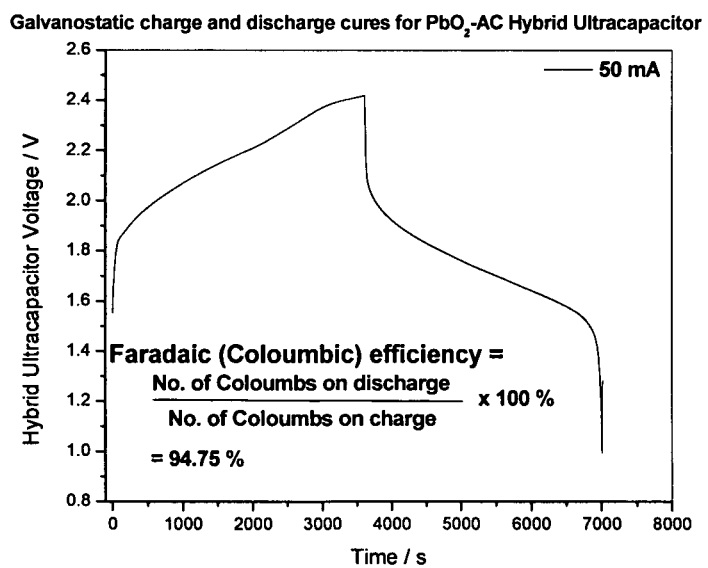
Figure 9:
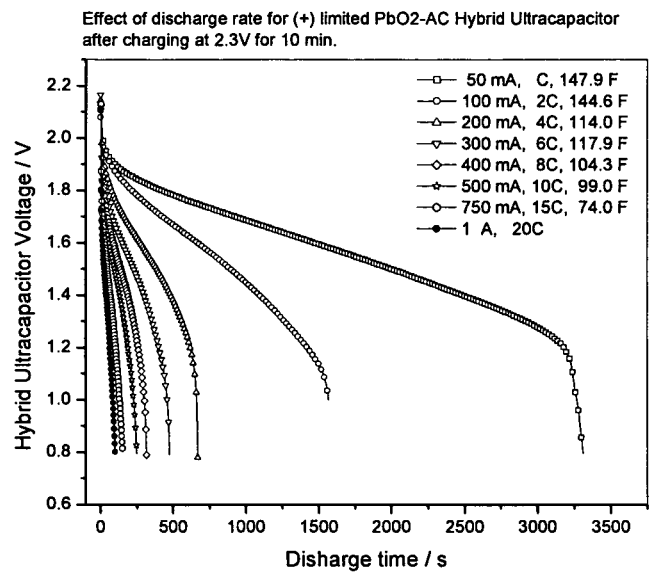
FIG. 9 illustrates the discharge curves at varying currents for the substrate-integrated $PbO_2$/Activated-carbon hybrid ultracapacitor followed by their charging at 2.3V for 10 min.
Figure 10:
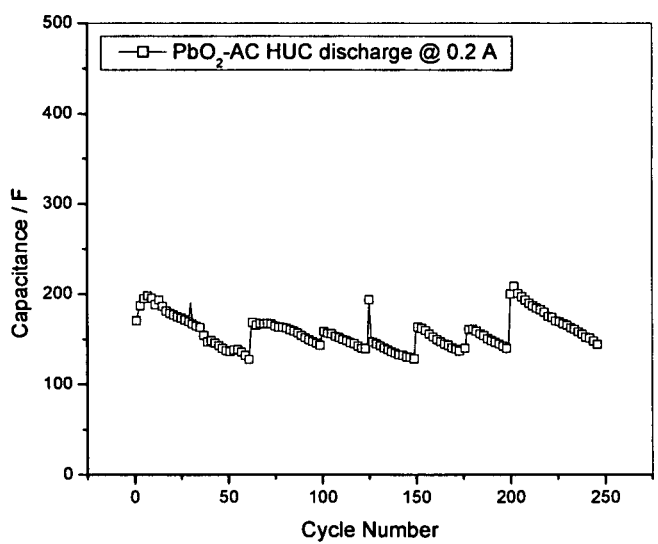
FIG. 10 shows the cycle-life data for the substrate-integrated $PbO_2$/Activated-carbon hybrid ultracapacitor.

Substrate-integrated-$PbO_2$ electrodes are prepared by etching pre-polished lead sheets (thickness 300 μm) in 1M $HNO_3$ for 60 s and subsequently washed copiously with deionized water. The sheets were then immersed in 6 M aqueous $H_2SO_4$ with 0.1 M $HClO_4$ as additive at room temperature. On immersing in aqueous sulfuric acid, a thin layer of lead sulfate is formed on the surface of the lead sheet which is oxidized to $PbO_2$ by using it as anode in an electrochemical cell fitted with a counter electrode. The process is repeated for about five times to prepare the fully-formed substrate-integrated $PbO_2$ electrodes. The electrochemical cell employed for this purpose is connected to a constant current dc supply as shown schematically in FIG. 3.

B. Preparation of PVDF Bonded Activated Carbon Electrodes.

Activated-carbon electrodes are prepared by pasting activated carbon ink containing polyvinylidene difluoride as a binder. In brief, a carbon paste was obtained by mixing 85% of high-surface-area carbon (BET surface area is about 2000 $m^2/g$ and particle size <10 nm) with 10 wt. % of carbon black (particle size is about 1 μm) and 5 wt. % of binder like PVDF dissolved in an appropriate quantity of dimethylformamide solvent or teflon. Typically, 0.1 g of PVDF is dissolved in 10 ml of DMF and 1.7 g of high surface area carbon (Meadwestvaco 090177) and 0.2 g of carbon black was added. The mixture was mixed well in an ultrasonicator for 5 min. The resulting carbon ink was brush coated onto two graphite electrodes of area 3.5 cm×6.0 cm with that had a tag area of 1 cm width and 3 cm length. The carbon paste was applied on both sides of the carbon electrodes so that each side of the electrode in order to get a 0.5 g of active material. Then the electrodes were dried in air oven for overnight (about 10 h) at 80° C.

C. Assembly of Substrate-Integrated $PbO_2$-AC Hybrid Ultracapacitors (HUCs)

a) 6V Substrate-Integrated $PbO_2$-AC Hybrid Ultracapacitor.

6V substrate-integrated $PbO_2$-AC HUCs were assembled by connecting three 2V HUCs in series. 2V/100 F substrate-integrated $PbO_2$/PVDF-bonded AC HUCs comprising a substrate-integrated $PbO_2$ electrode of size 3.5 cm×6 cm with a tag of 1 cm width and 3 cm length formed by aforementioned method and a PVDF-bonded carbon electrode prepared as described above were assembled using a 3 mm thick AGM (adsorbed glass mat) soaked with 6 M $H_2SO_4$ acid as the separator and electrolyte. The complete assembly, $PbO_2$-(AGM+$H_2SO_4$)-AC, was then assembled into a plexiglass container. The cell was then tested for its electrochemical characteristics.

b) 12V Substrate-Integrated $PbO_2$-AC Hybrid Ultracapacitor.

12V $PbO_2$-AC HUCs were assembled by connecting six HUCs in series. The details for assembling the HUCs are given as under.

2V/100F substrate-integrated $PbO_2$/PVDF-bonded AC HUCs comprising a substrate-integrated $PbO_2$ electrode of size 3.5 cm×6 cm with tags (6a, 6b) of 1 cm width and 3 cm length formed by aforementioned method and a PVDF-bonded carbon electrode prepared as described above were assembled using a 3 mm thick AGM (adsorbed glass mat) soaked with 6 M $H_2SO_4$ acid as the separator and electrolyte. The complete assembly, $PbO_2$-(AGM+$H_2SO_4$)-AC, was then assembled into a plexiglass container. The cell was then tested for its electrochemical characteristics.

c) 12V Substrate-Integrated $PbO_2$-AC Hybrid Ultracapacitor.

A 12V substrate-integrated $PbO_2$/Activated carbon hybrid ultracapacitor was realized by connecting six single cells in series in a commercial lead-acid battery container. Each cell of this 0.12V hybrid ultracapacitor comprises 9 positive and 8 negative plates of size 4.5 cm×7 cm with the tag (6b) area of 0.5 cm×0.5 cm and 0.3 mm thickness for the positive plate and 0.8 mm thickness for negative plates (6a); 1 mm thick AGM sheets were used as separator. A unique method was used to interconnect the graphite electrodes. The tag portion of the negative electrodes (6a) is electroplated with Tin followed by electroplating with lead which facilitates the graphite electrode tags (6b) to solder with each other. The graphite electrodes in each cell were soldered with lead by torch-melt method using an appropriately designed group-burning fixture. Subsequently, the cells were interconnected in series.

It is found that these hybrid ultracapacitors yield a capacitance value of 120 F at 5 C rate of discharge.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A hybrid ultracapacitor (1) comprising:
   a) a substrate-integrated-lead-dioxide electrode (2),
   b) a pure carbon-based double layer capacitor electrode (3) with a graphite sheet as substrate, and
   c) a separator (4) soaked in an electrolyte (5) and is fixed in-between the substrate-integrated-lead-dioxide electrode and the pure carbon-based double layer capacitor electrode in a container (6).
2. The hybrid ultracapacitor as claimed in claim 1, wherein the substrate of is lead.

3. The hybrid ultracapacitor as claimed in claim 1, wherein the separator (4) is made of material selected from a group comprising porous glass and porous polymers, preferably porous glass.

4. The hybrid ultracapacitor as claimed in claim 1, wherein the electrolyte is selected from a group comprising sulphuric acid, methanesulfonic acid, perflourosulphonic acid, preferably sulphuric acid.

5. The hybrid ultracapacitor as claimed in claim 4, wherein the sulphuric acid is concentrated in range from about 4M to about 7M, preferably about 6M.

6. The hybrid ultracapacitor as claimed in claim 1, wherein the hybrid ultracapacitor (1) is of faradaic efficiency ranging from about 94% to about 96%, preferably 95%.

7. The hybrid ultracapacitor as claimed in claim 1 (7) wherein there are a plurality of the hybrid ultracapacitors that are connected in series.

8. A method of preparing substrate-integrated-lead-dioxide electrode (2) for combining said electrode with a pure carbon-based double layer capacitor electrode, to obtain a hybrid ultracapacitor comprising the substrate-integrated-lead-dioxide electrode (2), a pure carbon double layer capacitor electrode (3) with a graphite sheet as substrate, and a separator (4) soaked in an electrolyte (5) and that is fixed in-between the substrate-integrated-lead-dioxide electrode and the pure carbon-based double layer capacitor electrode with the graphite sheet as substrate in a container (6), said method comprising acts of:
  a) etching pre-polished lead sheets using nitric acid;
  b) washing the etched lead sheets with deionized water;
  c) immersing the washed lead sheets in mixture of sulphuric acid and perchloric acid to obtain a layer of lead sulphate; and
  d) oxidizing the lead sulphate to lead dioxide to obtain substrate-integrated lead dioxide electrode.

9. The method as claimed in claim 8 wherein the substrate is lead.

10. The method of preparing substrate-integrated lead dioxide as claimed in claim 8, wherein the nitric acid is concentrated in the range from about 0.5M to about 1.5M, preferably about 1M.

11. The method as claimed in claim 8, the sulphuric acid is concentrated in the range from about 4M to about 7M, preferably about 6M.

12. The method as claimed in claim 8, wherein the perchloric acid is concentrated in the range from about 0.05M to about 0.2M preferably about 0.1M.

13. The method as claimed in claim 8, wherein the oxidation of lead sulphate to lead dioxide is by using the lead sulphate as an anode in an electrochemical cell.

14. A method of assembling a hybrid ultracapacitor (1), comprising acts of:
  a) preparing substrate-integrated lead dioxide electrode (2),
  b) preparing a pure carbon-based double layer capacitor electrode with graphite sheet as substrate (3), and
  c) mounting the substrate-integrated lead dioxide electrode (2), the pure carbon-based double layer electrode (3) in a container (6) with separator (4) soaked in an electrolyte (5) in-between the substrate-integrated lead dioxide electrode and the pure carbon-based double layer electrode to assemble the hybrid ultracapacitor.

15. The method as claimed in claim 14, wherein the substrate is lead.

16. A method of using a hybrid ultracapacitor (1) said method comprising the act of connecting the hybrid ultracapacitor (1) to an energy-storage device need thereof for generating energy for working of the device and wherein the hybrid ultracapacitor includes:
  a) a substrate-integrated-lead-dioxide electrode (2),
  b) a pure carbon-based double layer capacitor electrode (3) with a graphite sheet as substrate, and,
  c) a separator (4) soaked in an electrolyte (5) that is fixed in-between the substrate-integrated-lead-dioxide electrode and the pure carbon-based double layer capacitor electrode in a container (6).

17. The hybrid ultracapacitor as claimed in claim 1, wherein the capacitor yields a capacitance value of about 120 F at a 5 C rate of discharge.

18. A method of obtaining a series hybrid ultracapacitor (7) said series hybrid ultracapacitor (7) comprising a plurality of the hybrid ultracapacitors (1), wherein each hybrid ultracapacitor has a substrate-integrated-lead-dioxide electrode (2), a pure carbon-based double layer capacitor electrode (3) with a graphite sheet as substrate, and a separator (4) soaked in an electrolyte (5) and is fixed in-between the substrate-integrated-lead-dioxide electrode and the carbon electrode in a container (6), and the plurality of the hybrid ultracapacitors are connected in series, said method comprising the acts of:
  a) electroplating a tag portion of a graphite electrode 6(a) of the hybrid ultracapacitor with tin, followed by electroplating with lead; and,
  b) soldering the tag portion of the graphite electrode 6(a) of the hybrid ultracapacitor (1) using lead to interconnect the graphite electrode to obtain said series hybrid ultracapacitor.

* * * * *